Dec. 29, 1953  R. FENNEMA  2,664,264
CHECK VALVE MOUNTING
Filed Oct. 11, 1949  2 Sheets-Sheet 1

Inventor:
Richard Fennema
By Joseph O. Lange
Atty.

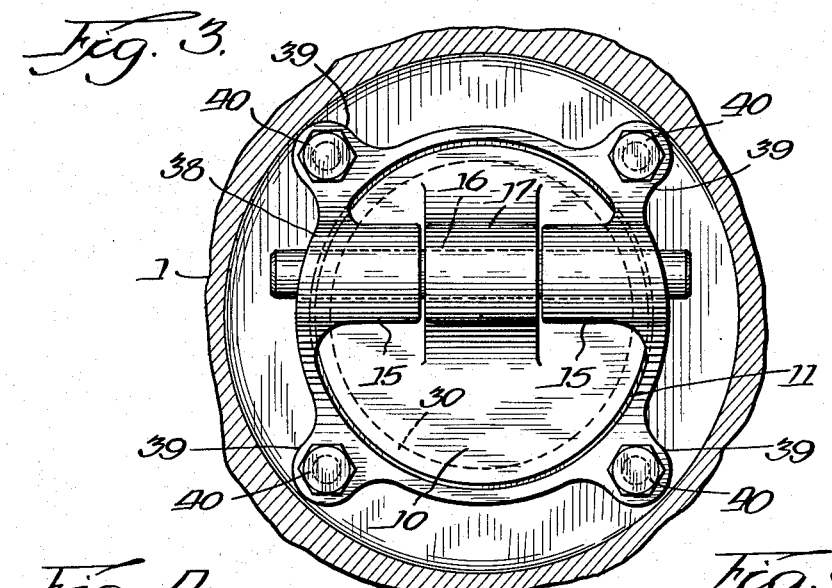
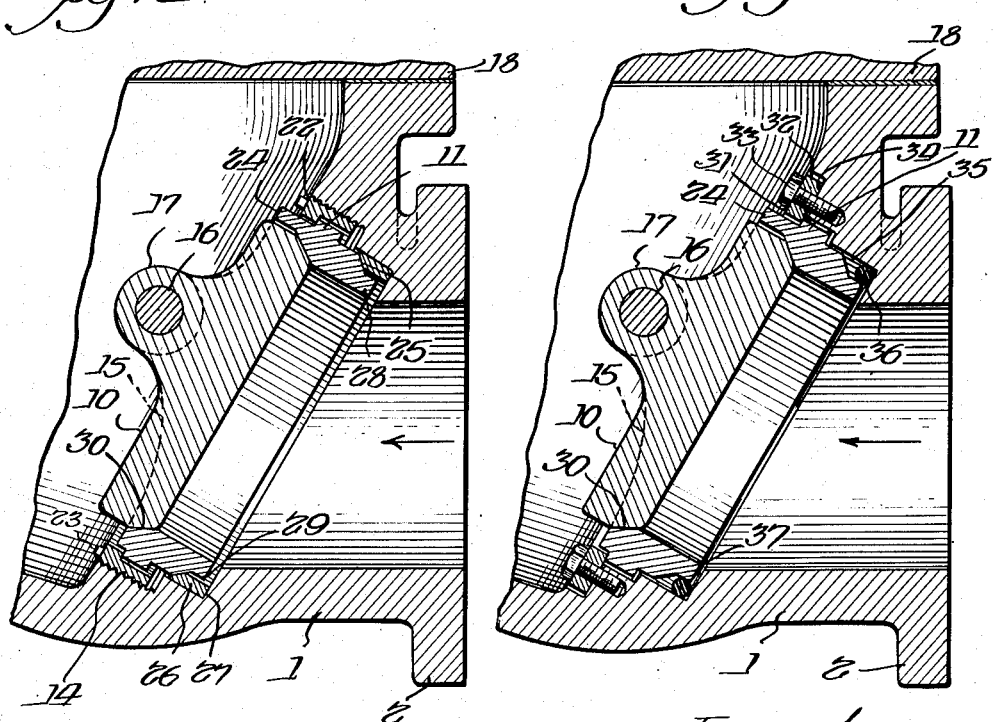

Patented Dec. 29, 1953

2,664,264

UNITED STATES PATENT OFFICE 2,664,264

CHECK VALVE MOUNTING

Richard Fennema, Chicago, Ill., assignor to Crane Co., Chicago, Ill., a corporation Application October 11, 1949, Serial No. 120,675

3 Claims. (Cl. 251—123)

This invention relates to a novel check valve mounting or the like. More particularly, it is concerned with what is termed in the art as the mounting for a tilting or pivotally suspended disc type of check valve.

In connection with check valves, particularly of the swing or pivotal check type, it should be understood that heretofore one of the real problems facing the industry and users was the fact that body distortion encountered during the normal course of service adversely affected the performance and tightness of the valve. In the present valve design, the advantages offered include the simple provision of a complete mounting unit insofar as the body seat ring, disc, and disc mounting is concerned, the complete unit being inserted and retained within the body and being self-contained thus avoids the previous objection that body distortion may affect the tightness of the valve.

Another important object is to provide for a mounting for the unit in which a flexible pressure seal joint is used, thereby eliminating or minimizing leakage between the body ring and the body, the joints becoming increasingly effective even as the pressure increases but slightly when the valve is in the closed position, and permitting predetermined axial movement of the mounting.

Another object is to provide for an economical check valve design which offers decided advantages in manufacture, since expensive fixtures are not required, as, for example, those used in the accurate drilling and positioning of previous forms of hinge pin and closure mountings in the body and thereby avoiding the requirements of a high degree of precision work previously found necessary in locating these hinge pins relative to the valve casing and seat.

Another important advantage obtained is that when it becomes necessary to inspect or to repair the valve of this invention, it is unnecessary to break the pipe lines, but the valve may be simply opened at an upper body cap portion and the valve operating unit removed integrally therefrom without the usual objectionable inconvenience and expense.

Other objects and advantages will become more readily apparent upon proceeding with the following specification read in light of the accompanying drawings, in which Fig. 1 is a sectional assembly view of a valve embodying my invention.

Fig. 3 is a plan view of a modified form of the invention.

Fig. 4 is a further modified form of the invention, employing a threaded retainer ring.

Fig. 5 is a modified form of the invention employing a novel packing and retainer means.

Similar reference numerals refer to similar parts throughout the several views.

Figure 1:
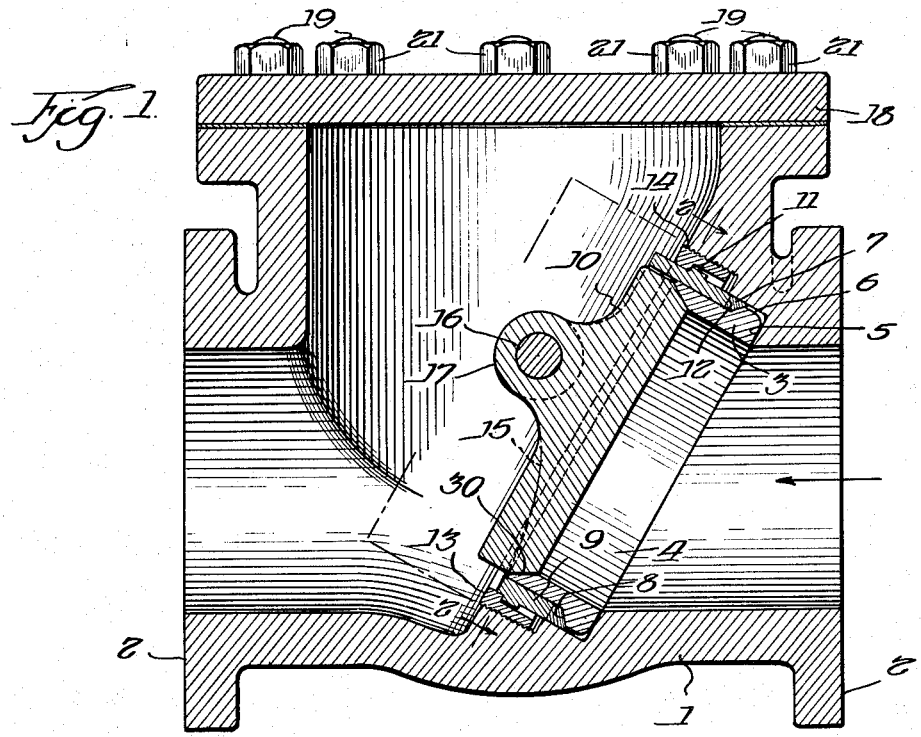

Referring now to Fig. 1, a conventional check valve body or casing 1 is shown having the usual pipe line connecting ends 2 the line fluids entering the valve body at the inlet port or passage indicated by the arrow. Within the valve body 1, and preferably mounted at an inclined position to the horizontal plane, the novel pivotal check unit embodying this invention, which consists of a body seat ring 3 ported as at 4 and shouldering as at 5 is mounted within the casing 1. At its lower end portion, the body seat ring is preferably thickened, as at 6, to receive the soft metal sealing ring or packing 7, the latter preferably making an angle contact therewith, as at 8. In order to maintain the soft metal sealing ring 7 in compression, a gland member 9 is employed having a shoulder 11 and an annular extension 12 bearing upon an upper surface portion of the packing 7. A disc or closure member 10 is hingedly mounted therewithin as hereinafter described in greater detail. The annular shoulder 11 of the gland is engaged by the retaining ring 13, which is preferably threadedly mounted relative to the casing, as indicated at 14.

Figure 2:
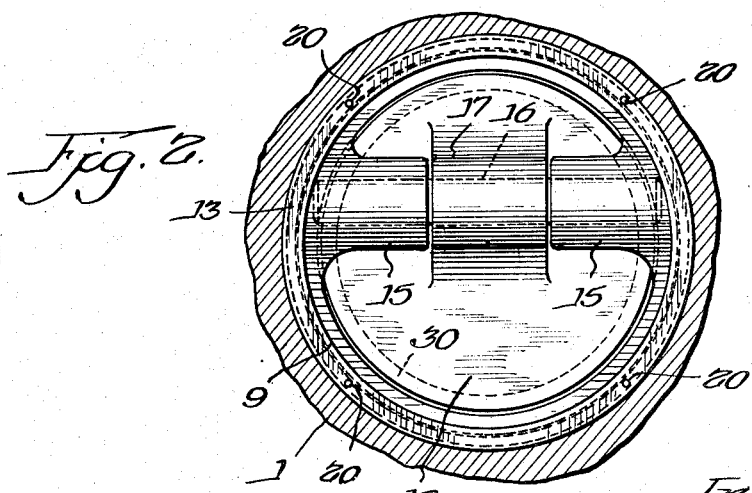
Fig. 2 is a sectional view taken on the line 2—2 of Fig. 1.

Thus, as illustrated, the retaining ring of annular form holds the gland firmly in axial position against the packing 7 to compress the latter. As shown more clearly in Fig. 2, the gland 9 is provided with the transversely extending oppositely disposed bosses or journals 15 of hollow form and preferably integral therewith to receive the hinge shaft or pin 16. A complementary boss 17, integral with the disc 10, receives the central journaling portion of the shaft thereof, As more clearly shown in Fig. 2, the shaft member 16 is mounted so as to be rotatably movable when the shaft 16 is placed within the end bosses 15 to engage the central boss 17 of the closure member. It will, of course, be understood that the inner walls of the body 1 at opposite sides thereof will prevent undue axial movement of the shaft or hinge pin 16 relative to the bosses 15, thereby to retain the hinge pin in desired position regardless of the position of the valve in installation. The retaining ring 13 may be tightened by rotation with a suitable spanner wrench (not shown) engaging the holes 20, the valve disc or closure member 10 normally seating as at 30.

The body is capped in the conventional manner by means of the cap 18 held in place by the usual studs 19 and nuts 21.

It will be appreciated that the closure member 10 being eccentrically mounted relative to the hub 17 will normally seat, as indicated, when the pressure or flow subsides. The valve is of the general type shown in the Price Patent number 1,744,798, issued January 28, 1930, with the closure member seating at 30, as indicated in the accompanying drawings.

A modified mounting is shown in connection with Fig. 3, wherein instead of the threaded retainer ring employed in Fig. 1, it has been found desirable, especially for large size valves, to use a ring 38 with the apertured lugs or ears 39 with the bolts 40 engaging the body or casing 1 to hold the seat-ring in place, shouldered as at 11.

A further modified mounting is shown in Fig. 4, wherein the retainer ring 22 with tightening lugs 23 engages the shouldered combined gland and seat 24, the latter being provided at its lower end portion with an inclined annular surface 25 bearing against the sealing ring or packing 26 which is shouldered within the casing as at 27. The member 24 is provided with an annular extension 28 to retain the packing 26 within a chamber, as indicated, so that line flow or pressure may enter such chamber annularly to further aid in compressing the packing 26 as mounted within the annular chamber 29.

As to the other modified form shown in Fig. 5, it should, of course, be obvious that the form of retainer ring may be changed and in addition the forms of the packing rings may vary also. Instead, the shouldered retainer 31, as also described in connection with Fig. 3, may employ the integral apertured lugs 32, the ring 31 being held in position by bolts 33 threadedly engaging the body 1, and shouldered as at 34, to effect the desired retention of the seat ring 24, thereby to form an annular chamber 35 which receives the O-ring 36. In this construction, it will be noted that line fluid pressure will enter the annular clearance or space at 37 between the end of the ring 24 and the casing to force the O-ring 36 into pressure-sealing relation to form a seal therebetween. Here, similarly, the disc is pivotally mounted as described in connection with the other figures and seats at 30, as illustrated.

Thus, it will be apparent that a relatively simple, flexible, economical, and effective swing or pivotal check valve mounting has been provided, which is capable of use under a variety of service conditions.

It should also be clear that the particular forms of construction used are not necessarily limited to the embodiments illustrated and described. Therefore, the spirit of the invention should be measured by the scope of the appended claims.

I claim:

1. In a check valve construction comprising in combination, a casing, a pivotally mounted closure member therefor, a shouldered seat ring within said casing, a gland member having means for pivotally suspending said closure member, compressible sealing means between a shouldered portion of the seat ring and a recessed portion of the casing receiving said seat ring, and a retainer ring having means for holding the said gland member against the said sealing means to compress the latter in pressure sealing relation to the said casing and to the seat ring adjacent the shouldered portion of the latter member.

2. In a check valve construction comprising in combination, a casing, a pivotally mounted closure member therefor, a seat ring having a shouldered portion received within the said casing, a gland member limitedly movable axially within a recessed portion of the casing, compressible sealing means between the said gland member and the shouldered portion of the said seat ring, the gland member having superposed means for pivotally supporting said closure member, and axially movable retainer means for holding the said gland member in pressure sealing relation to the said casing by initial compression applied against the said sealing means the said seat ring at its shouldered portion being suitably formed to support said sealing means against a wall of said casing.

3. In a check valve construction comprising in combination, a casing, a pivotally mounted closure member therefor, a seat ring having a lower annular shouldered portion supported within a recessed portion of the said casing, a gland member having superposed hinge means for pivotally mounting said closure member relative to said seat ring, and retainer means engaging a recessed portion of the said casing adjacent the said seat ring for holding the said gland member in predetermined axial relation to the said casing, and compressible packing means interposed between the said gland member and the said seat ring to bear against an annular inclined rear surface on the shouldered portion of the seat ring.

RICHARD FENNEMA.

References Cited in the file of this patent

UNITED STATES PATENTS

| Number | Name | Date |
| --- | --- | --- |
| 463,175 | St. John | Nov. 17, 1891 |
| 1,140,377 | Johnson | May 25, 1915 |
| 1,190,917 | Lamb | July 11, 1916 |
| 1,326,430 | Walsh | Dec. 30, 1919 |
| 2,143,399 | Abercrombie | Jan. 10, 1939 |
| 2,192,339 | Wilson | Mar. 5, 1940 |
| 2,262,726 | Nickerson | Nov. 11, 1941 |
| 2,268,518 | Sonderman et al. | Dec. 30, 1941 |
| 2,321,597 | Hobbs | June 15, 1943 |
| 2,426,392 | Fennema | Aug. 26, 1947 |

FOREIGN PATENTS

| Number | Country | Date |
| --- | --- | --- |
| 432,865 | Germany | of 1926 |